(12) United States Patent
Kim et al.

(10) Patent No.: US 9,833,983 B2
(45) Date of Patent: Dec. 5, 2017

(54) POLARIZING PLATE COMPRISING AN EXTERNAL SURFACE BONDED TO A GLASS SUBSTRATE OF A LIQUID CRYSTAL CELL WITHOUT AID OF AN ADDITIONAL MEMBER

(71) Applicant: Samsung Display Co. Ltd., Yongin, Gyeonggi-Do (KR)

(72) Inventors: Jong Seong Kim, Seoul (KR); Sang Il Kim, Yongin-si (KR)

(73) Assignee: SAMSUNG DISPLAY CO. LTD., Gyeonggi-Do (KR)

(*) Notice: Subject to any disclaimer, the term of this patent is extended or adjusted under 35 U.S.C. 154(b) by 168 days.

(21) Appl. No.: 14/308,928

(22) Filed: Jun. 19, 2014

(65) Prior Publication Data

US 2015/0219949 A1 Aug. 6, 2015

(30) Foreign Application Priority Data

Feb. 5, 2014 (KR) ........................ 10-2014-0013104

(51) Int. Cl.
| | |
|---|---|
| *B32B 38/00* | (2006.01) |
| *G02B 5/30* | (2006.01) |
| *G02F 1/1335* | (2006.01) |
| *G02B 1/14* | (2015.01) |
| *B32B 38/14* | (2006.01) |

(52) U.S. Cl.
CPC ............ *B32B 38/0012* (2013.01); *G02B 1/14* (2015.01); *G02B 5/3033* (2013.01); *B32B 38/14* (2013.01); *B32B 2038/0028* (2013.01); *B32B 2038/0076* (2013.01); *B32B 2307/42* (2013.01); *B32B 2315/08* (2013.01); *B32B 2457/202* (2013.01); *B32B 2551/00* (2013.01); *G02F 1/133528* (2013.01); *Y10T 156/10* (2015.01)

(58) Field of Classification Search
CPC ....... G02F 1/13362; G02B 1/18; B32B 38/14; B32B 2038/0028; B32B 2457/202; B32B 38/0012; B32B 2551/00; B32B 2307/42
See application file for complete search history.

(56) References Cited

U.S. PATENT DOCUMENTS

| | | | | |
|---|---|---|---|---|
| 3,869,196 | A * | 3/1975 | Kubota ................ | G04G 9/0035 349/112 |
| 2003/0016447 | A1* | 1/2003 | Kato .................... | G02B 5/1814 359/569 |
| 2006/0170837 | A1* | 8/2006 | Asami ................. | H04N 9/3167 349/50 |
| 2009/0068917 | A1* | 3/2009 | Kim .................... | H01L 51/5246 445/25 |

(Continued)

FOREIGN PATENT DOCUMENTS

| | | |
|---|---|---|
| KR | 1020080058519 A | 6/2008 |
| KR | 1020090073021 A | 7/2009 |
| KR | 1020110097078 A | 8/2011 |

(Continued)

*Primary Examiner* — Paul Lee
(74) *Attorney, Agent, or Firm* — Cantor Colburn LLP

(57) ABSTRACT

A polarizing plate includes a first glass plate; a second glass plate facing the first glass plate; and a polarizing device between the first and second glass plates. An external surface of at least one of the first and second glass plates, which is not in contact with the polarizing device, has a root mean square surface roughness of about 1 nanometer or less.

5 Claims, 12 Drawing Sheets

(56) References Cited

U.S. PATENT DOCUMENTS

2013/0044282 A1  2/2013 Kuwabara et al.
2013/0242397 A1* 9/2013 Ogumi ................. G02B 5/0221
                                                   359/601

FOREIGN PATENT DOCUMENTS

| KR | 1020110119325 A | 11/2011 |
| KR | 1020110126352 A | 11/2011 |
| KR | 10-1109443 B1   | 1/2012  |
| KR | 10-1112443 B1   | 1/2012  |
| KR | 1020120047536 A | 5/2012  |
| KR | 1020120071745 A | 7/2012  |
| KR | 10-1276384 B1   | 6/2013  |

* cited by examiner

POLARIZING PLATE COMPRISING AN EXTERNAL SURFACE BONDED TO A GLASS SUBSTRATE OF A LIQUID CRYSTAL CELL WITHOUT AID OF AN ADDITIONAL MEMBER

This application claims priority to Korean Patent Application No. 10-2014-0013104 filed on Feb. 5, 2014, and all the benefits accruing therefrom under 35 U.S.C. §119, the disclosure of which is incorporated herein by reference in its entirety.

BACKGROUND

1. Field

Exemplary embodiments relate to a polarizing plate, a liquid crystal display ("LCD") including the polarizing plate and a method of fabricating the polarizing plate.

2. Description of the Related Art

Polarizing plates are commonly used in LCDs to control the vibration direction of light and thus to visualize a display pattern of the LCDs. LCDs boast of their wide range of application, ranging from small devices to laptop computers, LCD monitors, LCD color projectors, LCD televisions ("TVs"), navigation systems for automobiles, personal phones and various measuring equipment for indoor and outdoor use. Particularly, LCD monitors and LCD TVs often use relatively high-luminance backlight units to provide light thereto.

SUMMARY

A polarizing plate may include a polarizing device, and protective films on either surface of the polarizing device, and triacetyl cellulose ("TAC") films may be used as the protective films. However, the TAC films have relatively high moisture permeability, and may thus cause the polarizing plate to be bent, especially under relatively high-temperature, high-humidity conditions.

In addition, an adhesive such as a pressure sensitive adhesive ("PSA") is generally used to attach a polarizing plate to a liquid crystal cell of a display device, but the PSA may be easily deformed under high-temperature, high-humidity conditions.

One or more exemplary embodiment provides a polarizing plate and a liquid crystal display ("LCD") which are capable of securing high reliability even under relatively high-temperature, high-humidity conditions.

However, exemplary embodiments are not restricted to the one set forth herein. The above and other exemplary embodiments will become more apparent to one of ordinary skill in the art to which the invention pertains by referencing the detailed description of the exemplary embodiments given below.

According to one or more exemplary embodiment, there is provided a polarizing plate including a first glass plate; a second glass plate facing the first glass plate; and a polarizing device between the first and second glass plates. An external surface of at least one of the first and second glass plates, which is not in contact with the polarizing device, has a root mean square ("RMS") surface roughness of about 1 nanometer (nm) or less.

According to one or more exemplary embodiment, there is provided a polarizing plate including a first protective film; a second protective film facing the first protective film; and a polarizing device between the first and second protective films. The first protective film includes glass, the second protective film includes a copolymer film, and an external surface of the first protective film, which is not in contact with the polarizing device, has a RMS surface roughness of about 1 nm or less.

According to one or more exemplary embodiment, there is provided a liquid crystal display ("LCD") including a liquid crystal cell; a backlight unit; a lower polarizing plate between the liquid crystal cell and the backlight unit; and an upper polarizing plate on a viewing side of the liquid crystal cell. An external part of at least one of the lower and upper polarizing plates, which is in contact with the liquid crystal cell, includes glass, and an external surface of the external part has a RMS surface roughness of about 1 nm or less.

According to one or more exemplary embodiment, there is provided a method of fabricating a polarizing plate, including fabricating a polarizing device; and laminating thin glass plates onto opposing surfaces of the polarizing device.

According to one or more exemplary embodiment, there is provided a method of fabricating a polarizing plate including fabricating a polarizing device; laminating a thin glass plate onto a first surface of the polarizing device; and laminating a copolymer film onto an opposing second surface of the polarizing device.

According to one or more exemplary embodiment, bending of a polarizing plate even under high-temperature, high-humidity conditions is reduced or effectively prevented to secure high reliability of the polarizing plate.

In addition, bending of an LCD including the polarizing plate is reduced or effectively prevented to secure high reliability of the LCD.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
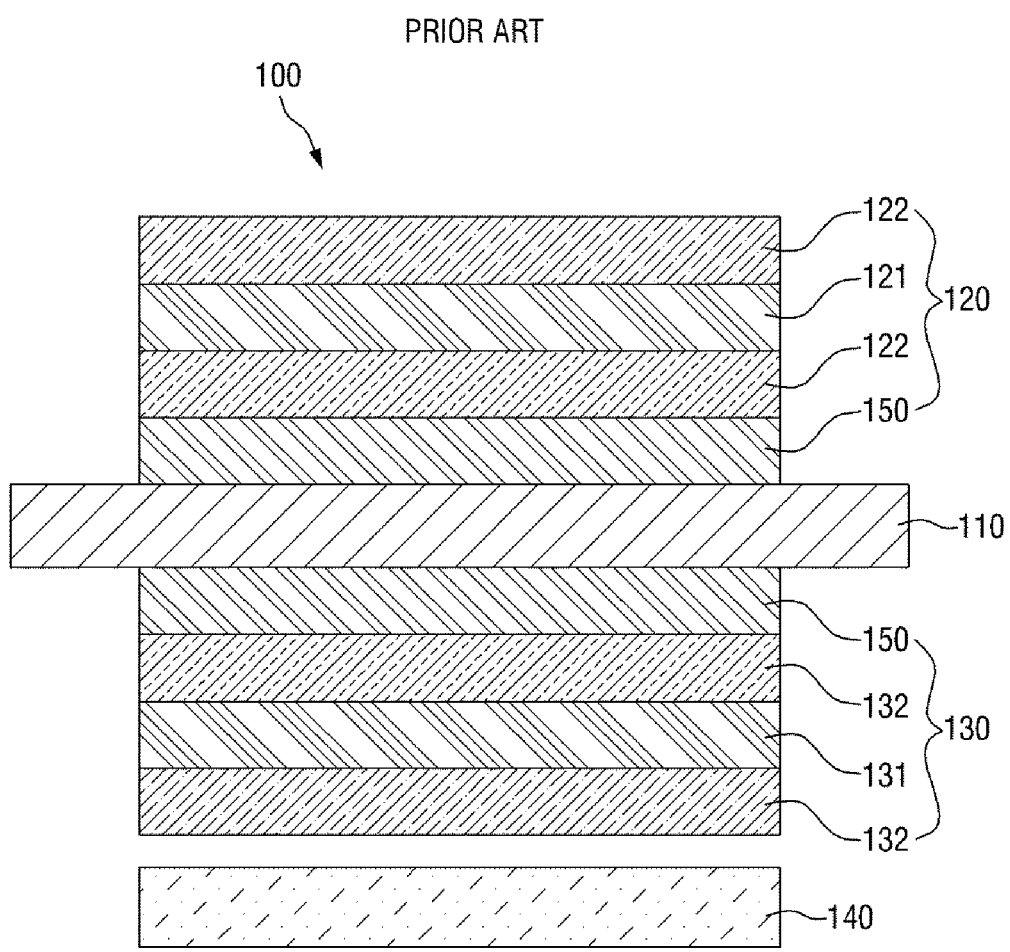
FIG. 1 is a partial cross-sectional view illustrating a related-art liquid crystal display ("LCD").

Advantages and features of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this disclosure will be thorough and complete and will fully convey the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, connected may refer to elements being physically and/or electrically connected to each other. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

The following detailed description is provided to assist in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Hereinafter, exemplary embodiments of the invention will be described with reference to the attached drawings.

Figure 2:
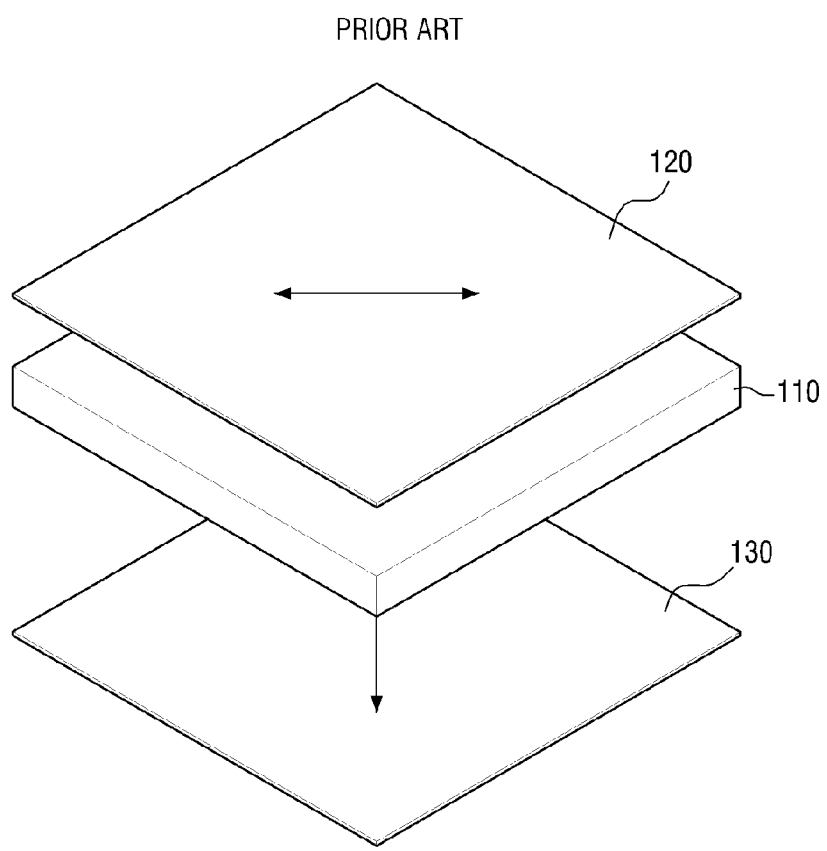
FIG. 2 is a partial exploded perspective view illustrating the related-art LCD of FIG. 1.
Figure 3:
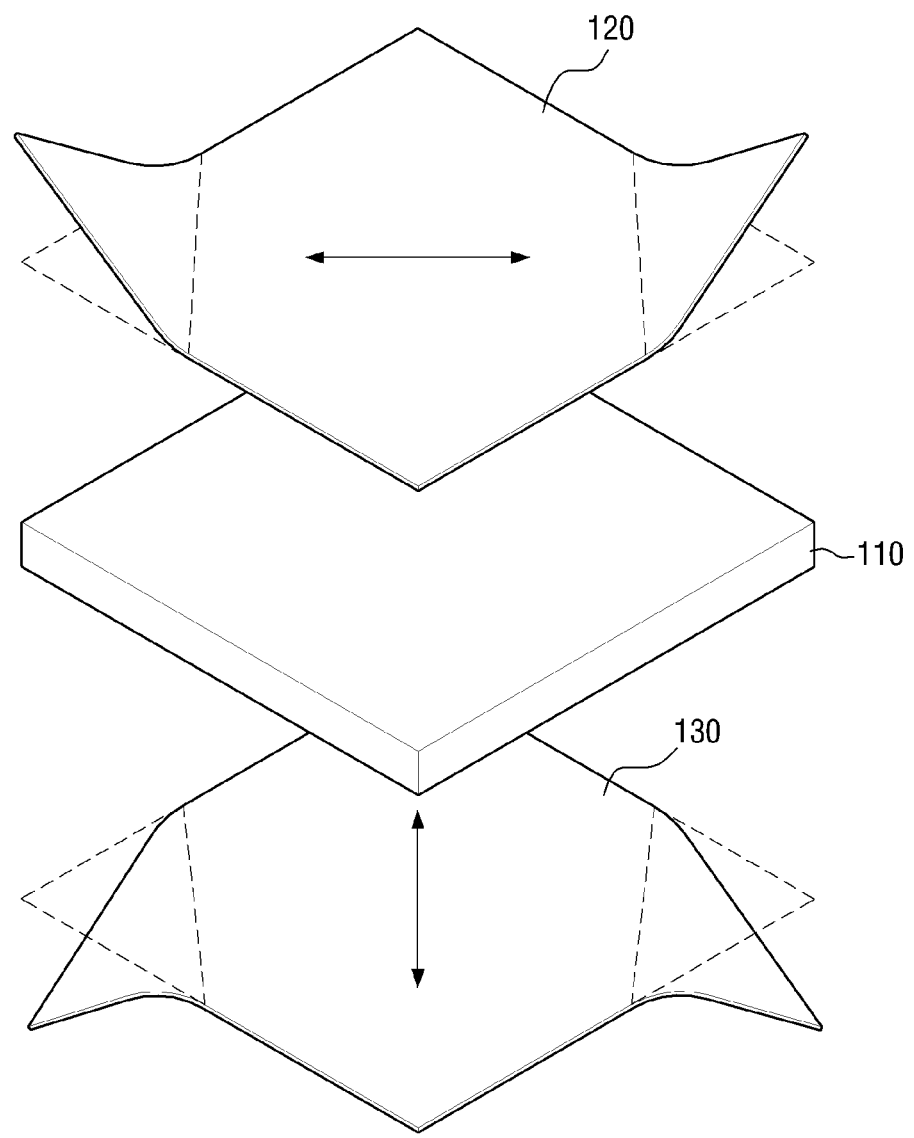
FIG. 3 is a partial perspective view illustrating variations in the related-art LCD that may be caused under high-temperature, high-humidity conditions.

FIG. 1 is a partial cross-sectional view illustrating a related-art liquid crystal display ("LCD"), FIG. 2 is a partial exploded view illustrating the related-art LCD, and FIG. 3 is a partial perspective view illustrating variations in the related-art LCD that may be caused under high-temperature, high-humidity conditions.

Referring to FIGS. 1 to 3, an LCD 100 includes a liquid crystal cell 110, a backlight unit 140, a lower polarizing plate 130 disposed between the liquid crystal cell 110 and the backlight unit 140, and an upper polarizing plate 120 disposed on a visible or viewing side of the liquid crystal cell 110. Where the upper and lower polarizing plates 120 and 130 are disposed on the top and the bottom, respectively, of the liquid crystal cell 110, the polarization axis of a polarizing device 121 of the upper polarizing plate 120 may be perpendicular to, or parallel to, the polarization axis of a polarizing device 131 of the lower polarizing plate 130. The upper polarizing plate 120 may include a pair of plates 122 with the polarizing device 121 interposed therebetween, and the lower polarizing plate 130 may include a pair of plates 132 with the polarizing device 131 interposed therebetween.

The upper and lower polarizing plates 120 and 130 may be coupled to the liquid crystal cell 110 via an adhesive layer 150.

The adhesive layer 150, which is a member including an adhesive material, may include a pressure sensitive adhesive ("PSA"). However, the PSA is easily deformable under high-temperature, high-humidity conditions, and may thus cause the liquid crystal cell 110 and/or the upper and lower polarizing plates 120 and 130 to be susceptible to deformation under the high-temperature, high-humidity conditions.

The upper polarizing plate 120 and the lower polarizing plate 130 may be disposed on opposing surfaces, respectively, of the liquid crystal cell 110 such that optical axes thereof may be perpendicular to each other. However, under high-temperature, high-humidity conditions, the polarizing devices 121 and 131 of the upper and lower polarizing plates 120 and 130 may contract and may thus be bent along their respective polarization axes (indicated by arrow-headed lines in FIG. 2 and FIG. 3. As a result, the liquid crystal cell 110, which is bonded to the upper and lower polarizing plates 120 and 130, may also be bent, thereby causing a defect.

Figure 4:
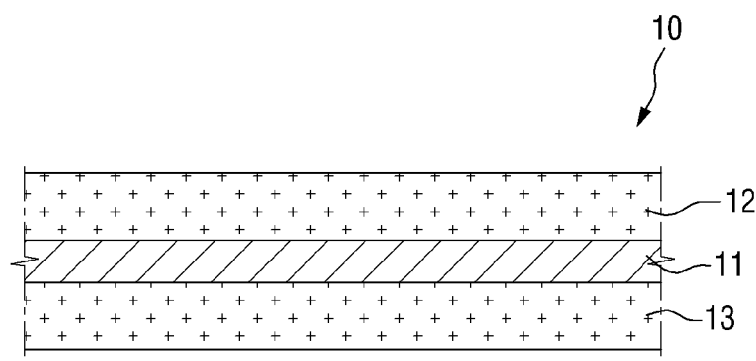
FIG. 4 is a cross-sectional view illustrating an exemplary embodiment of a polarizing plate according to the invention.

FIG. 4 is a cross-sectional view illustrating an exemplary embodiment of a polarizing plate according to the invention.

Referring to FIG. 4, a polarizing plate 10 may include a polarizing device 11, and first and second glass plates 12 and 13 disposed to face each other with the polarizing device 11 interposed therebetween.

In a non-limiting exemplary embodiment, the polarizing plate 10 may also include an adhesive layer disposed between the polarizing device 11 and the first glass plate 12, and an adhesive layer disposed between the polarizing device 11 and the second glass plate 13, respectively.

The polarizing device 11 may include a material with a polarization function such as, for example, a polyvinyl alcohol ("PVA")-based resin containing a dichroic material. The polarizing device 11 may also include an additive. In a non-limiting exemplary embodiment, the additive may be a surfactant or an antioxidant.

The polarizing device 11 may include a uniaxially drawn film or a biaxially drawn film. The polarizing device 11 may have a polarization axis defined therein along a direction in which the polarizing device 11 is drawn.

In a non-limiting exemplary embodiment, the dichroic material may be iodine, a dye, a pigment or a combination thereof.

In an exemplary embodiment, the PVA-based resin may be obtained by saponification of a polyvinyl acetate-based resin. In a non-limiting exemplary, the polyvinyl acetate-based resin may have a degree of saponification of about 80 mol % to about 100 mol % and a degree of polymerization of about 1,000 to about 10,000. In a non-limiting exemplary embodiment, the PVA-based resin may include a PVA or an ethylene-vinyl alcohol copolymer.

A cross-sectional thickness of the polarizing device 11 may be appropriately determined in consideration of the type of device to which the polarizing device 11 is to be applied. In a non-limiting exemplary, the polarizing device 11 may have a cross-sectional thickness of about 0.5 micrometer (μm) to about 15 micrometers (μm). Where the cross-sectional thickness of the polarizing device 11 is about 0.5 micrometer (μm) to about 15 μm, the polarizing device 11 can provide a polarization effect while being sufficiently thin.

In a non-limiting exemplary, the first and second glass plates 12 and 13 may be identical or may differ from each other in terms of their composition and/or the presence of any additives therein.

In a non-limiting exemplary embodiment, external parts or surfaces of at least one of the first and second glass plates 12 and 13 that are not in contact with the polarizing device 11 may have a root mean square ("RMS") surface roughness of about 1 nanometer (nm) or less. Where the RMS of the external parts or surfaces of the first and second glass plates 12 and 13 that are not in contact with the polarizing device 11 is about 1 nm or less, the first glass plate 12 and/or the second glass plate 13 may be bonded, without the aid of an additional member, to another glass plate having a similar surface roughness condition due to Van der Waals attractive force.

In another non-limiting exemplary embodiment, external parts or surfaces of at least one of the first and second glass plates 12 and 13 that are not in contact with the polarizing device 11 may have an RMS surface roughness of about 0.7 nm or less.

There is no particular restriction on the cross-sectional thickness of the first and second glass plates 12 and 13. In a non-limiting exemplary embodiment, the first and second glass plates 12 and/or 13 may have a cross-sectional thickness of about 1 μm to about 500 μm. Where the first and second glass plate 12 and/or 13 has a cross-sectional thickness of about 1 μm to about 500 μm, the first and second glass plates 12 and 13 may have flexibility. In another non-limiting exemplary, the first and second glass plates 12 and 13 may have a cross-sectional thickness of about 10 μm to about 200 μm.

Since the first and second substrates 12 and 13 have relatively very low moisture permeability, the first and second substrates 12 and 13 may reduce or effectively prevent bending of the polarizing plate 10 by reducing or effectively preventing infiltration of moisture into the polarizing device 11 so as to suppress the contraction of the polarizing device 11.

In addition, as already mentioned above, since there is no need to use an additional member to bond the first and/or second glass plates 12 and 13 to another glass plate, bending of the LCD 100 due to the deformation of the member may be reduced or effectively prevented.

Figure 5:
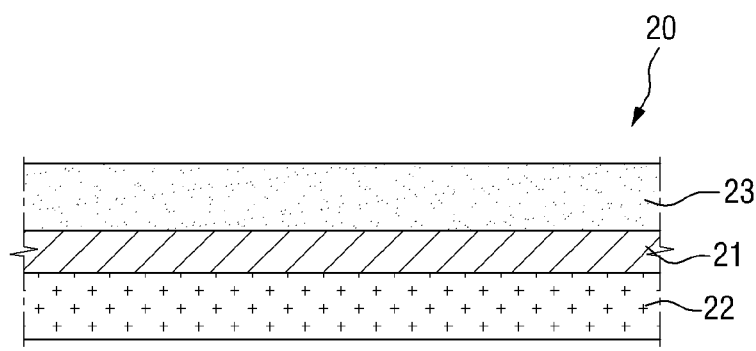
FIG. 5 is a cross-sectional view illustrating another exemplary embodiment of a polarizing plate according to the invention.

FIG. 5 is a cross-sectional view illustrating another exemplary embodiment of a polarizing plate according to the invention.

Referring to FIG. 5, a polarizing plate 20 may include a polarizing device 21, and first and second protective films 22 and 23 which face each other with the polarizing device 21 interposed therebetween.

In a non-limiting exemplary embodiment, an adhesive layer may be provided between the polarizing device 21 and the first protective film 22, and between the polarizing device 21 and the second protective film 23, respectively.

The polarizing device 21 is identical to the polarizing device 11 of FIG. 4, and thus, a detailed description thereof will be omitted.

The first protective film 22, like the first and second glass plates 12 and 13 of FIG. 4, may include glass, and thus, a detailed description thereof will be omitted.

There is no particular restriction on the material of the second protective film 23. In a non-limiting exemplary embodiment, the second protective film 23 may include one selected from among a cellulose-based resin such as triacetyl cellulose ("TAC") or diacetyl cellulose ("DAC"), a polyester-based resin such as polyethylene terephthalate ("PET"), polyethylene naphthalate ("PEN") or polybutylene terephthalate, a cyclic polyolefin-based resin, a polycarbonate ("PC")-based resin, a polyether-based resin, a polysulfone-based resin, a polyamide-based resin, a polyimide ("PI")-based resin, a polyolefin-based resin, a polyarylate ("PAR")-based resin, a PVA-based resin, and a combination thereof.

In a non-limiting exemplary embodiment, the polyester-based resin may include: a dicarboxylic acid such as terephthalic acid, isophthalic acid, 2,5-naphthalene dicarboxylic acid, 2,6-naphthalene dicarboxylic acid, 1,4-naphthalene dicarboxylic acid, 1,5-naphthalene dicarboxylic acid, diphenyl carboxylic acid, diphenoxy ethane dicarboxylic acid, diphenyl sulfone carboxylic acid, anthracene dicarboxylic acid, 1,3-cyclopentane dicarboxylic acid, 1,3-cyclohexane dicarboxylic acid, 1,4-cyclohexane dicarboxylic acid, hexahydro terephthalic acid, hexahydro isophthalic acid, malonic acid, dimethyl malonic acid, succinic acid, 3,3-diethyl succinic acid, glutaric acid, 2,2-dimethyl glutaric acid, adipic acid, 2-methyl adipic acid, trimethyl adipic acid, pimelic acid, azelaic acid, dimer acid, sebacic acid, suberic acid, or dodecanedicarboxylic acid; or a diol such as ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1-5, hexadiol, 2,2-bis(4-hydroxyphenyl)propane, or bis(4-hydroxyphenyl) sulfone. In this example, the polyester-based resin may be formed of, but is not limited to, a homopolymer of a carboxylic acid, a homopolymer of a diol, a copolymer of at least one dicarboxylic acid and at least two diols, a copolymer of at least two dicarboxylic acids and at least one diol, or a blended resin obtained by blending at least two of the homopolymers and the copolymers.

In a non-limiting exemplary, given that polyester shows crystallinity, an aromatic polyester such as PET, PEN, or a copolymer thereof may be used.

In an exemplary embodiment of manufacturing the second protective film 23, a polyester film may be obtained by melting and extruding, for example, the polyester-based resin, in the form of a film and cooling and solidifying the film with the use of a casting drum. In a non-limiting exemplary embodiment, a stretched polyester film may be used as the second protective film 23 to provide a crystalline polyester film. The stretched polyester film may be a uniaxially stretched polyester film or a biaxially stretched polyester film. Where the first protective film 22 includes an aromatic polyester as a main ingredient thereof, the second protective film 23 may include not only an aromatic polyester, but also a resin or an additive.

A transparent copolymer with uniform optical properties may be used as the second protective film 23. For transparency, in particular, an amorphous copolymer may be used. In a non-limiting example, a cellulose-based resin, a cyclic polyolefin-based resin (such as a norbornene-based resin), a PC-based resin, a PAR-based resin, an amorphous polyester resin, a PVA-based resin, polysulfone-based resin or a PI-based resin may be used. In another non-limiting example, the second protective film 23 may be a TAC-based film, a phase difference cyclo olefin polymer ("COP") film, or an acryl-based film.

There is no particular restriction on the cross-sectional thickness of the second protective film 23. In a non-limiting exemplary embodiment, the second protective film 23 may have a cross-sectional thickness of about 5 μm to about 200 μm. More specifically, the second protective film 23 may have a cross-sectional thickness of about 5 μm to about 100 μm to provide an overall thinner LCD.

Figure 6:
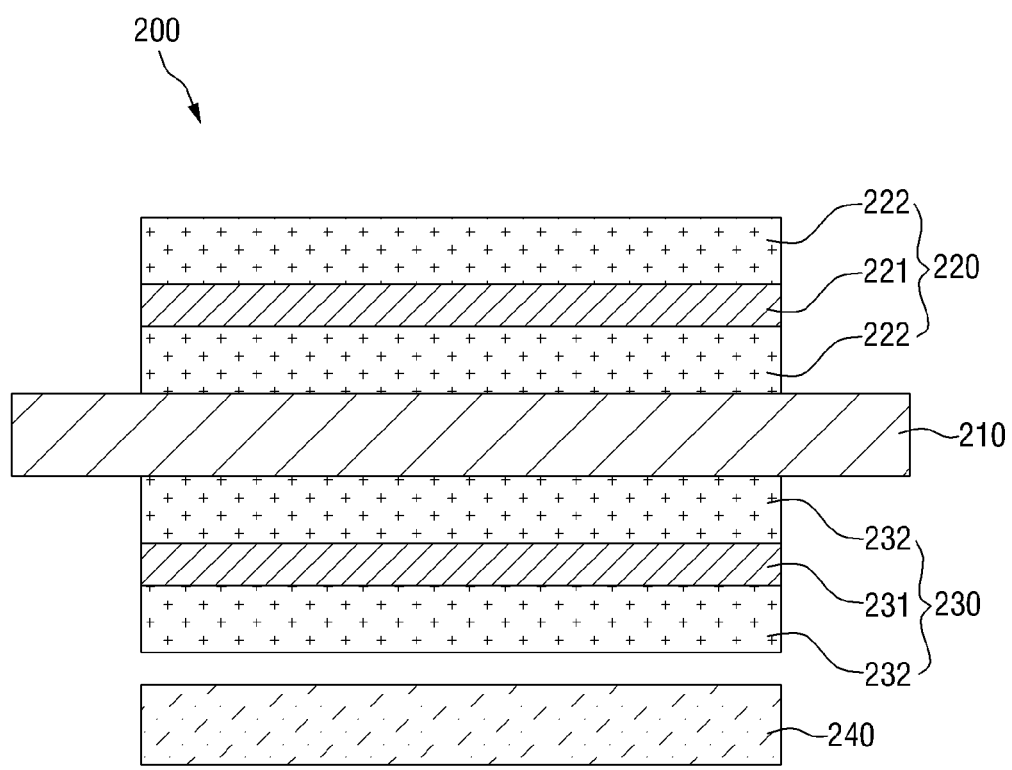
FIG. 6 is a cross-sectional view illustrating an exemplary embodiment of an LCD according to the invention.
Figure 7:
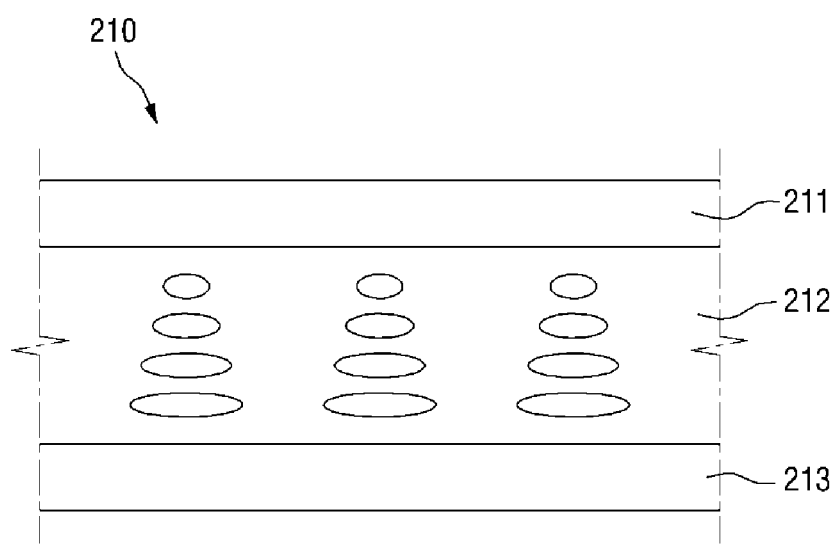
FIG. 7 is an enlarged cross-sectional view illustrating an exemplary embodiment of a liquid crystal cell in the LCD of FIG. 6.

FIG. 6 is a cross-sectional view illustrating an exemplary embodiment of an LCD according to the invention, and FIG. 7 is an enlarged cross-sectional view illustrating an exemplary embodiment of a liquid crystal cell in the LCD of FIG. 6.

Referring to FIGS. 6 and 7, an LCD 200 includes a liquid crystal cell 210, a backlight unit 240, a lower polarizing plate 230 disposed between the liquid crystal cell 210 and the backlight unit 240, and an upper polarizing plate 220 disposed on a visible or viewing side of the liquid crystal cell 210. Where the upper and lower polarizing plates 220 and 230 are disposed on the top and the bottom, respectively, of the liquid crystal cell 210, the polarization axis of a polarizing device 221 of the upper polarizing plate 220 may be perpendicular to, or parallel to, the polarization axis of a polarizing device 231 of the lower polarizing plate 230.

The upper polarizing plate 220 may include a pair of glass plates 222 with the polarizing device 221 interposed therebetween, and the lower polarizing plate 230 may include a pair of glass plates 232 with the polarizing device 231 interposed therebetween.

The liquid crystal cell 210 includes a liquid crystal panel including a first substrate 211, a second substrate 213, and a liquid crystal layer 212 interposed between the first and second substrates 211 and 213. The upper polarizing plate 220 may be disposed on one surface (for example, the top or viewing side surface) of the first substrate 211 of the liquid crystal cell 210. The lower polarizing plate 230 may be disposed on the bottom surface of the second substrate 213 of the liquid crystal cell 210.

In a non-limiting exemplary, the first and second substrates 211 and 213 that contact the upper and lower polarizing plates 220 and 230, respectively, may include glass. Where the first and second substrates 211 and 213 that respectively contact the upper and lower polarizing plates 220 and 230 include glass, the glass contacting surfaces of the first and second substrates 211 and 213 may have an RMS surface roughness of about 1 nm or less, and may be bonded to another glass plate or substrate having a smooth surface without the aid of an additional member such as an adhesive.

The first substrate 211 may be a color filter ("CF") substrate. More specifically, the first substrate 211 may collectively include a base substrate which includes a transparent insulating material such as glass or a plastic material, a black matrix (not illustrated) which is provided on the base substrate and reduces or effectively prevents light leakage, red (R), green (G) and blue (B) color filters (not illustrated), and a common electrode (not illustrated) which includes a transparent conductive oxide such as indium tin oxide ("ITO") or indium zinc oxide ("IZO") and generates an electric field alone or in combination with another electrode of the liquid crystal cell 210.

The second substrate 213 may be a thin-film transistor ("TFT") substrate. More specifically, the second substrate 213 may include a base substrate which includes a transparent insulating material such as glass or a plastic material, a plurality of TFTs each of which includes a gate electrode, a gate insulating layer, a semiconductor layer, a resistive contact layer and source/drain electrodes on the base substrate, and a plurality of pixel electrodes which include a transparent conductive oxide such as ITO or IZO and generate an electric field alone or together with the common electrode of the CF substrate 211.

In a non-limiting exemplary embodiment, plastic substrates may be used as the first and second substrates 211 and 213. In this exemplary embodiment, the plastic substrates may include one of, but are not limited to, PET, PC, PI, PEN, polyethersulfone ("PES"), PAR and COP. In another non-limiting exemplary embodiment, the first and second substrates 211 and 213 may include a flexible material. Where the first and second substrates 211 and 213 include a flexible material, the first and second substrates 211 and 213 may be flexible substrates obtained by coating plastic substrates with a thin glass plate.

The liquid crystal layer 212 may be a twisted nematic ("TN")-mode liquid crystal layer, a vertical alignment ("VA")-mode liquid crystal layer or a horizontal alignment (such as in-plane switching ("IFS") or fringe field switching ("FFS"))-mode liquid crystal layer with positive dielectric anisotropy. The description that follows assumes that the liquid crystal layer 212 is of the TN mode.

Where no electric field is applied to the liquid crystal layer 212 due to no difference between the pixel electrodes and the common electrode, liquid crystal molecules in the liquid crystal layer 212 may be aligned so as major axes thereof are parallel to the surfaces of the first and second substrates 211 and 213, as illustrated in FIG. 7, and may form a 90° twisted helical structure between the first and second substrates 211 and 213.

The linear polarization of light through the liquid crystal layer 212 may be affected by any retardation caused by the refractive anisotropy of the liquid crystal molecules in the liquid crystal layer 212. The direction of the linear polarization of light transmitted through the liquid crystal layer 212 may be rotated by 90° by adjusting the dielectric anisotropy ($\Delta\in$) and chiral pitch of the liquid crystal molecules in the liquid crystal layer 212 and the cross-sectional thickness of the liquid crystal layer 212, e.g., the cell gap of the liquid crystal cell 210.

Although not shown in the drawings, the backlight unit 240 may include a light guide plate, one or more light source units and a mold frame, and may also include a reflective member, one or more optical sheets and a bracket.

The light guide plate, which guides light generated by the light source units to travel toward the liquid crystal cell 210, may include a light incidence plane which is provided on one side of the light guide plate and receives light generated by the light source units, and a light exit plane which faces the light crystal cell 210. In a non-limiting exemplary, the light guide plate may include a material with a uniform refractive index such as poly methyl methacrylate ("PMMA") or PC.

Where the light guide plate includes a material with a uniform refractive index, light incident upon either side of the light guide plate has a smaller incidence angle than the critical angle of the light guide plate, and may thus all enter the light guide plate. In contrast, light incident upon the top or bottom surface of the light guide plate has a greater incidence angle than the critical angle of the light guide plate and may thus be evenly distributed within the light guide plate, instead of being emitted outward from the light guide plate.

A scattering pattern may be disposed on one of the top and bottom surfaces of the light guide plate, for example, on the bottom surface of the light guide plate, which faces the light exit plate, so that light guided by the light guide plate may be emitted upward from the light guide plate. In a non-limiting exemplary of manufacturing the LCD 200, the diffusion pattern may be printed such as with ink on one surface of the light guide plate so that light transmitted from the inside of the light guide plate may be emitted upward from the light guide plate. In another non-limiting exemplary embodiment of manufacturing the LCD 200, fine grooves or protrusions may be defined on or in the light guide plate as the scattering pattern.

The reflective member may be provided between the light guide plate and the bottom of a lower container of the backlight unit 240 and/or the LCD 200. The reflective member may reflect light emitted from the bottom of the light guide plate, e.g., light emitted away from the light exit plane of the light guide plate, and may thus supply the light back to the light guide plate. In a non-limiting exemplary embodiment of manufacturing the LCD 200, the reflective member may be formed as a film.

The light source units may be disposed to face the light incidence plane of the light guide plate. In a non-limiting exemplary, two light source units may be respectively provided on opposing sides of the light guide plate. In another non-limiting exemplary embodiment, only one light source unit may be provided on one side of the light guide plate. In another non-limiting exemplary embodiment, three or more light source units may be provided to correspond to three or more sides, respectively, of the light guide plate. In another non-limiting exemplary embodiment, a plurality of light source units may be provided to correspond to a single one of the sides of the light guide plate.

In a non-limiting exemplary embodiment, each of the light source units may include a plurality of light sources, and a printed circuit board ("PCB") on which the light sources are mounted to be spaced from one another.

The light sources may be white light-emitting diodes ("LEDs"), or red, green and blue (R, G and B) LEDs. Where the light sources are the R, G and B LEDs, white light may be generated by independently driving the light sources such as turning on the R, G and B LEDs at the same time.

The PCB may be a relatively thin substrate on which power lines are disposed. In a non-limiting exemplary embodiment, the PCB may be a metal core PCB ("MCPCB") including a metal material with excellent thermal conductivity. In another non-limiting exemplary embodiment, the PCB may be a flexible PCB ("FPCB"). To drive the light sources, power may be applied to the light source units via the power lines.

In a non-limiting exemplary embodiment, the top surface of the first substrate 211 and/or the bottom surface of the second substrate 213 may include glass so as to provide one or more direct bonding surfaces that do not include an additional member such as an adhesive therebetween.

Figure 8:
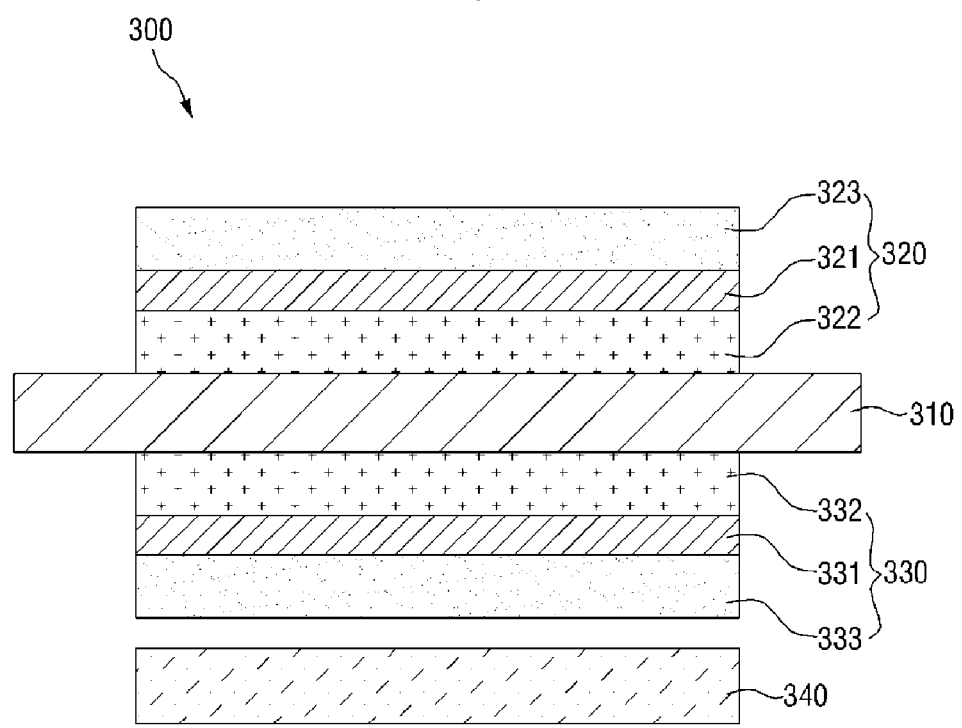
FIG. 8 is a cross-sectional view illustrating another exemplary embodiment of an LCD according to the invention.

FIG. 8 is a cross-sectional view illustrating another exemplary embodiment of an LCD according to the invention.

Referring to FIG. 8, an LCD 300 includes a liquid crystal cell 310, a backlight unit 340, a lower polarizing plate 330 disposed between the liquid crystal cell 310 and the backlight unit 340, and an upper polarizing plate 320 disposed on a visible side of the liquid crystal cell 310.

The upper polarizing plate 320 may include first and second protective films 322 and 323 and a polarizing device 321 interposed between the first and second protective films 322 and 323, and the lower polarizing plate 330 may include first and second protective films 332 and 333 and a polarizing device 331 interposed between the first and second protective films 332 and 333.

The first protective films 322 and 332 may include glass, and the second protective films 323 and 333 may include a copolymer film. The copolymer film has already been described above with reference to FIG. 5, and thus, a detailed description thereof will be omitted.

Figure 9:
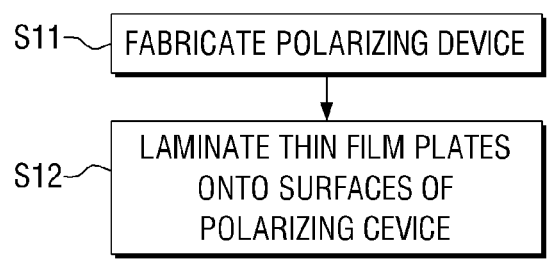
FIG. 9 is a flowchart illustrating an exemplary embodiment of a method of fabricating a polarizing plate, according to the invention.
Figure 10:
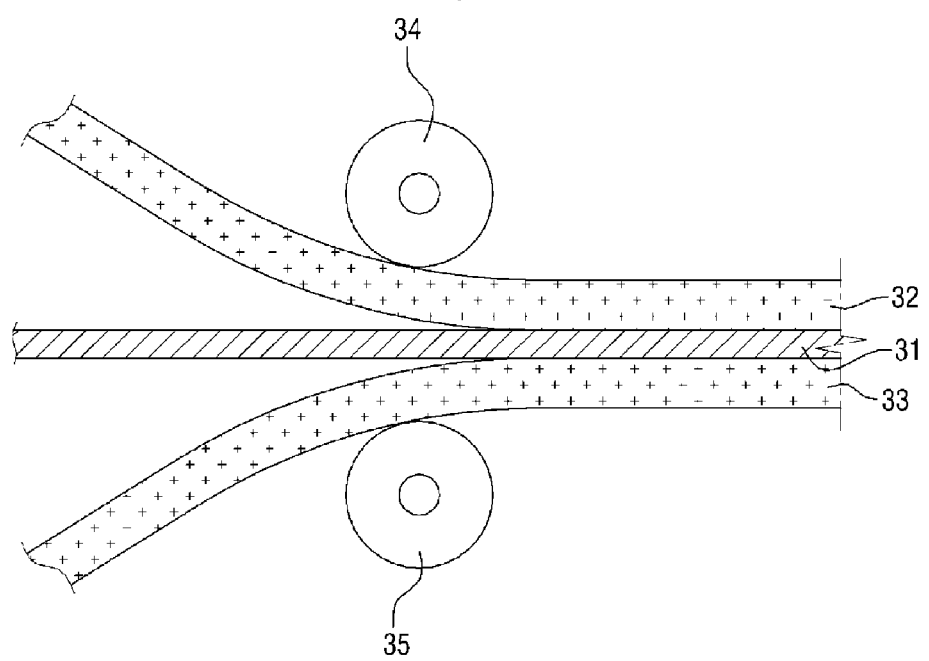
FIG. 10 is a perspective view illustrating the method of FIG. 9.

FIG. 9 is a flowchart illustrating an exemplary embodiment of a method of fabricating a polarizing plate, according to the invention, and FIG. 10 is a perspective view illustrating the method of FIG. 9.

Referring to FIGS. 9 and 10, a method of fabricating a polarizing plate includes fabricating a polarizing device 31 (S11), and laminating thin glass plates 32 and 33 onto opposing surfaces, respectively, of the polarizing device 31 (S12).

S11 may include a dyeing process for dyeing a base film with a dichroic pigment, and stretching the dyed film.

The description that follows assumes that a PVA-based film is used as the base film.

The dyeing process includes introducing a dichroic material such as iodine, a dye, a pigment or a combination thereof into the base film such that the base film can be colored. Molecules of the dichroic material may provide a polarization effect with a particular vibration direction by absorbing light that vibrates in a direction in which a polarizing film is stretched and transmitting therethrough light that vibrates in a perpendicular direction to the direction in which the polarizing film is stretched.

The dyeing process may be performed by immersing a PVA-based film in a solution of the dichroic material. Where the dichroic material is iodine, the PVA-based film may be immersed in an iodine solution with a temperature of about 20 degrees Celsius (° C.) to about 50° C. for about 10 seconds to about 300 seconds. In a non-limiting exemplary embodiment, an iodine aqueous solution containing iodine ($I_2$) and iodine ions such as, for example, potassium iodide (KI) which is commonly used as a supplemental dissolvent, may be used to dye the PVA-based film. Where the KI is used as a supplemental dissolvent, the iodine aqueous solution may contain about 0.01 weight percent (wt %) to about 0.5 wt % of iodine ($I_2$) and about 0.01 wt % to about 12 wt % of KI, based on a total weight of the iodine aqueous solution.

In a non-limiting exemplary embodiment, a swelling process for swelling the PVA-based film may be followed by the dyeing process. The swelling process may be performed to make the molecular chains within the PVA-based film flexible and loose and thus to uniformly apply the dichroic material into the PVA-based film without leaving any smudges.

The swelling process may be performed to achieve a swelling rate of about 110% to about 600%. During the swelling of the PVA-based film, the PVA-based film may be stretched to achieve an elongation ratio of 1.0 to 6.0. Where the PVA-based film is swollen and stretched to fall within the aforementioned ranges of swelling rates and elongation ratios, generation of smudges can be reduced or effectively prevented during the dyeing of the PVA-based film, provide a polarizing film with uniform optical properties and improved permeability while not affecting the physical properties of the polarizing film.

The swelling process may be performed by a dry swelling method or a wet swelling method. In a non-limiting exemplary embodiment, the PVA-based film may be swollen in a swelling tub filled with a swelling fluid, in the wet swelling method. The temperature at which the swelling of the PVA-based film is performed may vary depending on the cross-sectional thickness of the PVA-based film. In a non-limiting exemplary embodiment, the swelling of the PVA-based film may be performed at a temperature of 0° C. to about 100° C. In the dry swelling method, the swelling of the PVA-based film may be performed at a higher temperature than that of the wet swelling method.

In a non-limiting exemplary embodiment, a cross-linking process may be performed after the dyeing process.

More specifically, where the PVA-based film is dyed with molecules of the dichroic material, boric acid or borate may be used for a polymer matrix of the PVA-based film to absorb the molecules of the dichroic material. In a non-limiting exemplary embodiment, the cross-linking process may be performed by immersing the PVA-based film in an aqueous solution of boric acid. In another non-limiting exemplary embodiment, the cross-linking process may be performed by applying or spraying a predetermined solution onto the PVA-based film.

The stretching process may be performed by a wet stretching method and/or a dry stretching method.

Examples of the dry stretching method include, but are not limited to, an inter-roll stretching method, a heating roll stretching method, a contraction stretching method, and a tenter stretching method, and examples of the wet stretching method include, but are not limited to a tenter stretching method and an inter-roll stretching method.

In the wet stretching method being used, the PVA-based film may be stretched in an alcohol, water or an aqueous solution of boric acid by using a solvent such as methyl alcohol or propyl alcohol.

The temperature at, and the duration for, which the stretching of the PVA-based film is stretched may be appropriately determined based on the material of the PVA-based film, a desired elongation ratio, and the type of stretching method used. The PVA-based film may be uniaxially or biaxially stretched. To fabricate a polarizing film for being laminated to a liquid crystal cell, the PVA-based film may be biaxially stretched to realize phase difference properties.

In a non-limiting exemplary, the stretching of the PVA-based film may be performed to achieve an elongation ratio of 2.0:1 to 10:1.

The order in which the dyeing process and the stretching process are performed may vary depending on the type of device and equipment used. The stretching process may be performed together with the dyeing process or the cross-linking process. Where the stretching process and the dyeing process are performed at the same time, an iodine solution may be used in the stretching process. Where the stretching process and the cross-linking process are performed at the same time, an aqueous solution of boric acid may be used in the stretching process.

Referring again to FIGS. 9 and 10, in S12, thin glass plates 32 and 33 may be laminated onto the polarizing device 31 at the same time, or may be laminated onto one side of the polarizing device at a time and one after another.

In a non-limiting exemplary embodiment, for efficiency, the thin glass plates 32 and 33 may be laminated onto the polarizing device 31 at the same time by passing the thin glass plates 32 and 33 and the polarizing device 31 between laminating rollers 34 and 35 in a roll-to-roll manner. Where the thin glass plates 32 and 33 are laminated onto the polarizing device 31 at the same time, a roll-to-roll process may be performed, without causing damage to the thin glass plates 32 and 33, by appropriately adjusting the curvature of feeding and receiving rollers in consideration of the cross-sectional thickness of the thin glass plates 32 and 34.

Figure 11:
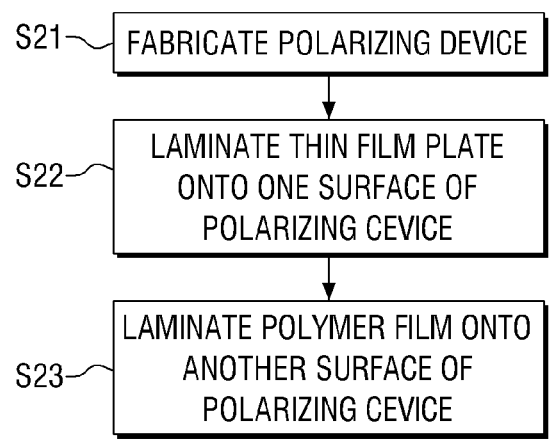
FIG. 11 is a flowchart illustrating another exemplary embodiment of a method of fabricating a polarizing plate, according to the invention.
Figure 12:
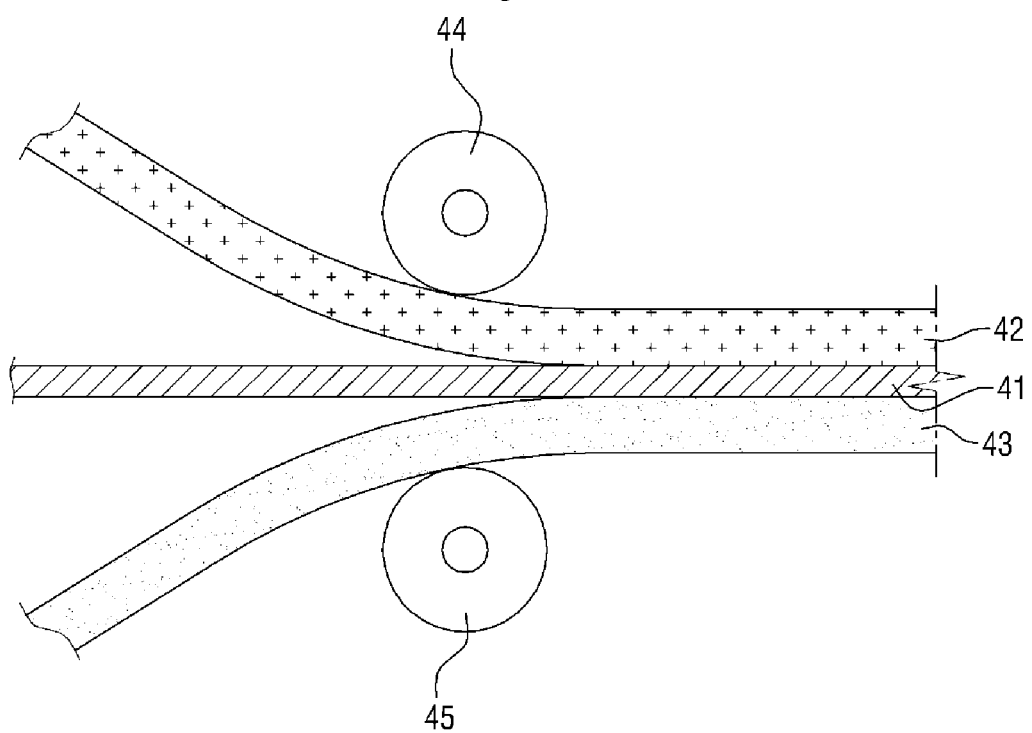
FIG. 12 is a perspective view illustrating the method of FIG. 11.

FIG. 11 is a flowchart illustrating another exemplary embodiment of a method of fabricating a polarizing plate, according to the invention, and FIG. 12 is a perspective view illustrating the method of FIG. 11.

Referring to FIGS. 11 and 12, a method of fabricating a polarizing plate includes fabricating a polarizing device 41 (S21), laminating a first protective film 42 on one surface of the polarizing device 41 (S22), and laminating a second protective film 43 on the other surface of the polarizing device 41 (S23).

The first protective film 42 may include glass, and the second protective film 43 may include a copolymer film.

S22 and S23 may be performed sequentially, or in reverse order, or may be performed at the same time.

In a non-limiting exemplary embodiment, for efficiency, the first and second protective films 42 and 43 may be laminated onto the polarizing device 41 at the same time by passing the first and second protective films 42 and 43 and the polarizing device 41 between laminating rollers 44 and 45 in a roll-to-roll manner. Where the first and second protective films 42 and 43 are laminated onto the polarizing device 41 at the same time, a roll-to-roll process may be performed, without causing damage to the first and second protective films 42 and 43, by appropriately adjusting the curvature of feeding and receiving rollers in consideration of the cross-sectional thickness of the first and second protective films 42 and 43.

Although the invention has been described with reference to a number of illustrative exemplary embodiments, it should be understood that numerous other modifications and exemplary embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A polarizing plate, comprising:
  a first glass plate;
  a second glass plate facing the first glass plate; and
  a polarizing device between the first and second glass plates,
  wherein
  one of the first and second glass plates defines an external surface not in contact with the polarizing device, and an internal surface in contact with the polarizing device, and
  the external surface of the one of the first and second glass plates is an external surface of the polarizing plate to which a substrate of a liquid crystal cell external to the polarizing plate is bonded without aid of an additional member, such external surface having a root mean square surface roughness of about 1 nanometer or less and such substrate comprising glass.

2. The polarizing plate of claim 1, wherein the external surface of each of the first and second glass plates has the root mean square surface roughness of about 1 nanometer or less.

3. The polarizing plate of claim 1, wherein the external surface of the at least one of the first and second glass plates has the root mean square surface roughness of about 0.7 nanometer or less.

4. The polarizing plate of claim 1, wherein the polarizing device comprises a resin comprising polyvinyl alcohol containing a dichroic material.

5. The polarizing plate of claim 1, wherein the first and second glass plates have a thickness of about 1 micrometer to about 500 micrometers.

* * * * *